Patented Oct. 30, 1934

1,978,404

UNITED STATES PATENT OFFICE 1,978,404

METHOD OF PRODUCING KETONES

Grover Bloomfield, Lloyd C. Swallen and Francis M. Crawford, Terre Haute, Ind., assignors to Commercial Solvents Corporation, Terre Haute, Ind., a corporation of Maryland No Drawing. Application February 19, 1930, Serial No. 429,811. In Canada October 1, 1929

25 Claims. (Cl. 260—134)

Our invention relates to a process of obtaining ketones from alcohols. More particularly, our invention relates to a process of obtaining ketones from alcohols containing more than two carbon atoms at elevated temperatures and preferably at reduced pressures in the presence of appropriate catalysts.

In the past, acetone has generally been obtained commercially by one or the other of two extensively used methods. In the dry distillation of hard woods, pyroligneous acid, containing among other substances acetic acid, is obtained. Calcium acetate obtained by the neutralization of this acid is converted in turn into acetone by dry distillation. More recently, large quantities of acetone have been obtained as a by-product in the production of n-butyl alcohol by fermenting carbohydrates. Both of these processes present certain disadvantages from a commercial viewpoint which need not be presented here.

We are aware also of the fact that in the past ketones have been made from secondary alcohols. Secondary alcohols undergo decomposition at a dull red heat, giving hydrocarbons by dehydration and ketones by dehydrogenation, the one or the other reaction predominating as the case may be. The transformation of secondary alcohols into ketones is even more readily accomplished by the aid of catalysts such as finely divided copper. Isopropyl alcohol is decomposed slowly from 150° C., the production of acetone being rapid at 250° to 430° C. without separation of propylene. Secondary butyl alcohol is attacked at 160° C. and furnishes butanone readily at 300° C. Similarly, secondary octyl alcohol yields octanone (2) and cyclohexanone may be obtained from cyclohexanol.

We have now made the discovery that ketones may also be obtained from alcohols by subjecting the latter to the action of elevated temperatures, preferably, in the presence of catalysts. The nature of the reaction in our new process is different in the case of primary alcohols from that when secondary alcohols are involved. With the latter we have a case of straight chain dehydrogenation and the ketone formed contains the same number of carbon atoms as the alcohol. In the case of primary alcohols, however, an alcohol containing $n$ carbon atoms yields a symmetrical ketone containing $2n-1$ carbon atoms. Examples of our preferred method of carrying out this new reaction will be described below.

Suitable catalysts for effecting the conversion of alcohols to ketones at elevated temperatures and reduced pressures may be selected from a wide range of materials. Among those which have been found to be efficacious for this purpose are the oxygen compounds of metals of the first and second long periods of the periodic system, as for example, oxygen compounds of iron, manganese copper and other heavy metals (that is to say, iron oxide, oxidized iron, manganic hydroxide, copper hydroxide, copper carbonate, etc.). Also, metals, as for example, iron, have been found capable of producing the reaction. Other substances or mixtures containing such substances, as for example, ferruginous minerals, may be employed advantageously.

The efficiency of catalysts of the above-mentioned character may be considerably increased by the use of auxiliary substances furthering the reaction, as for example, oxygen compounds of alkaline earth metals, including magnesium, such as calcium carbonate, calcium oxide, magnesium oxide, and the like.

One of the most efficient catalysts which we have tried is of the character disclosed in United States Patents Nos. 1,625,924, 1,625,925, 1,625,927, 1,625,928, and 1,625,929, issued April 26, 1927 for use in the production of synthetic methanol. These catalysts initially comprise a plurality of difficultly reducible metal oxides, a plurality of easily reducible metal oxides, and a metallic halide, as for example, zinc oxide, iron oxide, and zinc chloride.

Below will be found a description of the composition and method of preparing a number of catalysts suitable for use in our new process. It is distinctly understood, however, that these examples are cited merely as illustrative of the character of the catalyst mixtures which we prefer to use and that we are in no way bound to the use of the examples cited. Many other combinations may also be satisfactorily employed in our process.

Example I 125 grams chromium nitrate
20 grams calcium acetate
96 grams ammonium carbonate The chromium nitrate and calcium acetate are dissolved in two liters of water. After warming to 50° C. the ammonium carbonate, dissolved in 300 c. c. of water, is added. After warming to 50°–60° C. for half an hour, the precipitate is filtered off, washed thoroughly on the filter, and dried in the air at room temperature. It is then broken up, screened to 8–14 mesh and used in this form.

Example II 135 grams ferric nitrate
100 grams calcium acetate
2 liters water Precipitated with:

150 grams anhydrous potassium carbonate
500 c. c. water

The procedure is the same as that described under Example I except that after filtering the precipitate as dry as possible, it is worked up with about two liters of distilled water until free from lumps, warmed for about half an hour at 50°-60° C., then filtered and washed as usual.

Example III 61 grams cupric nitrate
64 grams magnesium nitrate
2 liters water Precipitated with 450 c.c. of 10% sodium hydroxide solution. The procedure outlined under Example I is then followed.

Example IV 160 grams chromium nitrate ($Cr(NO_3)_3 \cdot 9H_2O$) are dissolved, with heating, in 60 c.c. water. After the solution has cooled, 10 grams zinc chloride and 96 grams ferric nitrate are added. To the resulting cold solution 100 grams zinc oxide are then added with constant stirring. The resulting wet mass is heated in a porcelain evaporating dish to dryness and then placed in a copper crucible in which it is heated over a Fletcher burner to drive off the nitrogen peroxide fumes. The material thus obtained is crushed sufficiently to pass a 65 mesh screen and to it 8.2 grams zinc chloride dissolved in 60 c.c. water are added. The product thus obtained hardens spontaneously.

Example V 3900 grams zinc nitrate ($Zn(NO_3)_2 \cdot 6H_2O$) and 500 grams uranium nitrate ($UO_2(NO_3)_2 \cdot 6H_2O$) are dissolved in 5 liters of warm water. To this mixture is added sufficient potassium carbonate to precipitate all of the zinc and uranium as carbonate and basic carbonate. The resultant precipitate is recovered, washed, dried and moistened with a solution containing 200 grams zinc chloride. The mass is again dried and is broken up into granules, whereupon it is ready for use.

Example VI 2250 grams of cobalt nitrate ($Co(NO_3)_2 \cdot 6H_2O$) are dissolved in 250 liters of water and the solution is heated to 95° C. There is then added 7.5 kilograms of zinc oxide after which the solution is vigorously stirred and sufficient ammonium hydroxide is added to precipitate the cobalt as cobalt hydrate. The precipitated mass is recovered by decantation and filtration, is washed, dried and broken up into granules. The granules are then moistened with a solution containing 1480 grams zinc chloride and dried once more.

Example VII 2600 grams zinc oxide in powdered form are mixed by thorough sifting with 500 grams of black copper oxide. The resultant mixture is moistened with an aqueous solution containing 150 grams cuprous chloride and 200 grams of dextrin. The resultant mass is dried and broken up into pieces whereupon it is ready for use.

Example VIII 3500 grams of ferric nitrate are dissolved in 50 liters of water and sufficient ammonium hydroxide is added to precipitate all of the iron as ferric hydroxide. The flocculent mass is filtered and washed and to it is added 9 kilograms of zinc oxide and the mixture thoroughly stirred. The resultant pasty mass is allowed to dry and is then broken up into granules. To these granules is added a solution containing 1500 grams ferric chloride. The mass is again dried, whereupon it is ready for use.

When an alcohol such as, for example, butyl alcohol, is passed at suitable temperature over catalysts of the character just described, dipropyl ketone is obtained together with certain other products the character of which varies considerably depending upon the conditions employed, the presence or absence of other materials with the alcohol being treated, etc. We have found that in carrying out our new process it is not necessary that the alcohol undergoing reaction be absolutely pure. Other substances which do not react with the alcohol or the ketone being formed, or which do not react to form substances reacting in turn with these two compounds, may be present with the alcohol without producing appreciably harmful effects. In some cases, as will be shown hereafter, the presence of such materials may even produce beneficial results.

While our process for the catalytic conversion of alcohols to ketones may be carried out satisfactorily at either ordinary or reduced pressures, we have found that somewhat better results are obtained at pressures appreciably lower than atmospheric, than at ordinary pressures. We have found also that we may satisfactorily attain reduced pressure conditions suitable for carrying out our process in a number of ways. For instance, materials substantially inert under the conditions of the reaction may serve to lower the partial pressure of the alcohol being reacted, and thus accomplish the same result as if the reaction had actually been carried out under a partial vacuum.

We may employ any of a number of methods of conducting the alcohol over the catalyst under reduced pressure. These methods are equally satisfactory from the point of view of the efficacy of the reaction and the particular one adopted for use will depend upon the facilities available to the operator or the particular needs of a certain process. We may, for example, create a partial vacuum in the reaction chamber and introduce the alcohol to be reacted at such a rate as to maintain the desired reduced pressure in the reaction zone. The ketone thus formed and the unconverted alcohol are continually removed and recovered by any convenient method such as by condensing or by any suitable adsorption or solvent recovery process.

Another convenient method of attaining the desired reduced pressure is by mixing the alcohol to be reacted with a material inert under the conditions of the reaction in sufficient quantity to reduce the partial pressure of the alcohol to be reacted to the desired degree. Inert materials which we have found to be especially suitable for this purpose are, for example: nitrogen gas, carbon dioxide gas, hydrogen gas, the gaseous products formed during the reaction, other inert gases, the vapors of compounds which are inert under the conditions of the operation, etc. Water vapor is also a suitable diluent material for this reaction although there is evidence that it serves as a reactant rather than an inert material.

A convenient and economical method of attaining the desired reduced pressure is by using as the inert diluent the gaseous reaction products formed in the process. The required proportion of these gaseous products, after removal of the ketones unconverted alcohol and any other condensable products that may be formed by side reactions, by condensation, scrubbing or other suitable method and supplemented by additional inert material, if necessary, is mixed with the alcohol vapor to be reacted and again passed over the catalyst. In this way the process may be carried out in a cyclic manner, the required partial pressure of the alcohol being maintained by purging at intervals, or continuously, a portion of the gaseous reaction products or, if necessary, making additions of gaseous inert material from an auxiliary source of supply. The mass action effect of these gaseous reaction products employed as diluents is apparently small since the conversion of alcohol to ketone is, if at all, only slightly reduced by their use.

Of the various diluent materials which it is possible to employ, water vapor is possibly the most economical and convenient. In the case of alcohols miscible with appreciable proportions of water, the vapors of a dilute aqueous solution of the alcohol may be passed directly over the heated catalyst, or, preferably, thru a preheater and then thru the heated catalyst. More accurately regulated mixtures of alcohol vapor and water vapor—resulting in more accurately regulated partial pressure of the alcohol being reacted—may be obtained by vaporizing the alcohol and water in different vessels and later mixing the desired quantities of the vapors of the two substances. The use of water vapor has certain advantages as the diluent gas to be employed in that the ketone formed is somewhat more easily condensed and recovered than in the presence of only inert uncondensable materials. When an uncondensable gas or a material in which the ketone is not soluble is employed as the means of reducing the partial pressure of the alcohol being treated or when the reaction is carried out at reduced pressures without the aid of a diluent material such as has been enumerated, it is usually necessary to pass the gases issuing from the reaction chamber thru a scrubbing or solvent recovery system of some kind for the purpose of recovering the ketone.

After a number of days use, the catalyst begins to lose its efficiency and the rate of conversion of alcohol to ketone decreases appreciably. We have found, however, that the original efficiency of the catalyst may be easily and quickly restored. When the rate of conversion has decreased to a point beyond which the operation of the process is not economical, the operation may be stopped and the catalyst reactivated by passing over it oxygen or an oxygen-containing gas such as air, for a number of hours at temperatures of about 450°–600° C.

The table given below shows experimental results obtained with different alcohols, different catalysts and under different operating conditions.

| Alcohol | Catalyst | C. c. alcohol per c.c. of cat. per hour | Temp. °C. | Alcohol partial pressure mm. | Means of attaining partial pressure | Conversion to ketone % |
|---|---|---|---|---|---|---|
| Butyl | IV | 1.8 | 400 | Ordinary pressure | | 30* |
| Do | IV | .05 | 400 | 14 | Water vapor | 65* |
| Isopropyl | IV | .10 | 450 | 25 | do | 60† |
| Butyl | IV | .14 | 450 | 28 | Vacuum (no diluent). | 30* |
| Do | IV | .12 | 400 | 25 | Carbon dioxide. | 52* |

*On basis of two mols of alcohol giving one mol of ketone.
†On basis of one mol of alcohol giving one mol of ketone.

The examples shown above are cited merely for the purpose of illustrating the varied conditions under which our new process may be satisfactorily operated and it is distinctly understood that we are not limited by any of the conditions therein cited.

We have described above the preparation of dipropyl ketone from n-butyl alcohol, and acetone from isopropyl alcohol. It is distinctly understood, however, that our invention is not limited to these alcohols but applies equally well to other alcohols such as propyl, secondary butyl, amyl, etc. Likewise, the process may be satisfactorily carried out on mixtures of alcohols, as for example, propyl and butyl alcohols. In the latter case, a mixture of ketones—diethyl, dipropyl, and ethyl propyl ketone—is usually obtained.

The reaction may be carried out over a fairly wide range of temperatures, say from about 250° C. to about 650° C. We prefer, however, to employ temperatures ranging from about 400° C. to about 500° C. This factor, of course, may be varied considerably depending upon the other factors such as volume of catalyst, rate of flow of alcohol vapor, pressure employed, method of attaining the desired pressure, etc.

The pressure at which the reaction is effected may also be varied over a fairly wide range, it being possible to use pressures ranging from approximately 10 mm. to slightly above atmospheric. Altho somewhat better results are obtained by carrying out the process at pressures lower than atmospheric, generally it is not economically feasible to work with pressures covering the entire range specified above. We prefer to make use of pressures ranging from about 10 mm. to about atmospheric. It is understood, of course, that in this connection we use the terms "pressure" and "reduced pressure" as meaning also "partial pressure" in case the desired reduced pressure of the alcohol being reacted is obtained by the use of an inert diluent instead of by the use of vacuum.

It is understood also that when carrying out our process at reduced pressures we do not confine ourselves to any particular method of obtaining the desired reduced pressures nor to any particular pressure. For example, we may either maintain a partial vacuum in the reaction vessel or we may attain the same result by diluting the alcohol vapor to be reacted with a sufficient amount of an inert material (under the conditions of the reaction) to reduce the partial pressure of the alcohol vapor to the desired degree. We prefer to make use of nitrogen or carbon dioxide gases or the gaseous products formed during the reaction for this purpose, but we may also use other substances. In view of the reactivity of water in this reaction, it is to be understood that water vapor as a diluent is excluded when the expression "the alcohols constitute the only reactants present in substantial concentration" is utilized in the present specification and in the appended claims.

We have found that our new process may be satisfactorily carried out by the aid of a fairly wide variety of catalysts, and while we prefer to employ catalysts of the character described in this specification, it is distinctly understood that we do not confine ourselves to the use of only such materials.

It is to be understood that in the present case no claim is made to the production of acetone from ethyl alcohol. This feature of our invention is claimed in copending applications Ser. No. 364,318, filed May 18, 1929 and Ser.

No. 419,737, filed January 9, 1930. The present application deals solely with the production of higher ketones from alcohols containing more than two carbon atoms.

Now having described our invention, what we claim as new and novel is:

1. Process for the production of ketones which comprises subjecting to the action of catalysts comprising essentially oxygen compounds of metals of the first long period of the periodic table, at temperatures from 250° C. to 650° C., a gaseous mixture in which the vapors of alcohols containing more than two carbon atoms are the only reactants present in substantial concentration and in which the pressures for the said alcohol vapors are substantially lower than atmospheric.

2. Process for the production of ketones which comprises subjecting to the action of catalysts comprising essentially oxygen compounds of metals of the first long period of the periodic table, and of an auxiliary substance comprising essentially an oxygen compound of an alkaline earth metal, at temperatures from 250° C. to 650° C., a gaseous mixture in which the vapors of the alcohols containing more than two carbon atoms are the only reactants present in substantial concentration and in which the pressures for the said alcohol vapors are substantially lower than atmospheric.

3. Process for the production of ketones which comprises subjecting to the action of catalysts comprising essentially a plurality of difficultly reducible metal oxides, a plurality of easily reducible metal oxides and a metallic halide, at temperatures from 250° C. to 650° C., a gaseous mixture in which the vapors of alcohols containing more than two carbon atoms are the only reactants present in substantial concentration and in which the pressures for the said alcohol vapors are substantially lower than atmospheric.

4. Process for the production of ketones which comprises subjecting to the action of catalysts comprising essentially a plurality of difficultly reducible metal oxides, a plurality of easily reducible metal oxides and a metallic halide, and of an auxiliary substance comprising essentially an oxygen compound of an alkaline earth metal, at temperatures from 250° C. to 650° C., a gaseous mixture in which the vapors of alcohols containing more than two carbon atoms are the only reactants present in substantial concentration and in which the pressures for the said alcohol vapors are substantially lower than atmospheric.

5. In a process in which alcohols containing more than two carbon atoms are transformed primarily into ketones by the action of essentially heavy metal oxide catalysts, the improvement which comprises passing through the reaction zone, at temperatures from 250° C. to 650° C., a gaseous mixture in which the said alcohols constitute the only reactants present in substantial concentration and in which the partial vapor pressure of said alcohols is substantially lower than atmospheric.

6. In the catalytic production of ketones from alcohols containing more than two carbon atoms, the improvement which comprises passing through the reaction zone, at temperatures from 250° C. to 650° C., a gaseous mixture in which the said alcohols constitute the only reactants present in substantial concentration and in which the partial vapor pressure of said alcohols is between 10 mm. and 250 mm. (mercury).

7. In the catalytic production of ketones from alcohols containing more than two carbon atoms, the improvement which comprises passing through the reaction zone, at temperatures from 250° C. to 650° C. and at pressures substantially lower than atmospheric, vapors consisting of said alcohols.

8. In the catalytic production of ketones from alcohols containing more than two carbon atoms, the improvement which comprises passing through the reaction zone, at temperatures from 250° C. to 650° C. and at pressures from 10 mm. to 250 mm. mercury, vapors consisting of said alcohols.

9. In a process in which alcohols containing more than two carbon atoms are transformed primarily into ketones by the action of essentially heavy metal oxide catalysts, the improvement which comprises passing through the reaction zone, at temperatures from 250° C. to 650° C., a vapor mixture comprising essentially said alcohols and a vapor substantially inert under the conditions of the reaction, said mixture containing less than ½ mol. of water per mol. of said alcohols.

10. In the catalytic production of ketones from alcohols containing more than two carbon atoms, the improvement which comprises passing through the reaction zone, at temperatures from 250° C. to 650° C., a vapor mixture comprising essentially said alcohols and a vapor inert under the conditions of the reaction, said mixture containing less than ½ mol. of water per mol. of said alcohols, and the partial pressure of the vapor of said alcohols in said mixture being from 10 mm. to 250 mm. mercury.

11. In a process in which alcohols containing more than two carbon atoms are transformed primarily into ketones by the action of essentially heavy metal oxide catalysts, the improvement which comprises passing through the reaction zone, at temperatures from 250° C. to 650° C., a vapor mixture comprising essentially said alcohols and a vapor inert under the conditions of the reaction, said mixture being substantially free from water.

12. In the catalytic production of ketones from alcohols containing more than two carbon atoms, the improvement which comprises passing through the reaction zone, at temperatures from 250° C. to 650° C., a vapor mixture comprising essentially said alcohols and a vapor inert under the conditions of the reaction, the partial pressure of the vapor of said alcohols in said mixture being from 10 mm. to 250 mm. mercury, and said mixture being substantially free from water.

13. In a process in which alcohols containing from two to five carbon atoms are transformed primarily into ketones by the action of essentially heavy metal oxide catalysts, the improvement which comprises passing through the reaction zone, at temperatures from 250° C. to 650° C., a gaseous mixture in which the said alcohols constitute the only reactants present in substantial concentration and in which the partial vapor pressure of said alcohols is substantially lower than atmospheric.

14. In the catalytic production of ketones from alcohols containing from two to five carbon atoms, the improvement which comprises passing through the reaction zone, at temperatures from 250° C. to 650° C., a gaseous mixture in which the said alcohols constitute the only reactants present in substantial concentration and in which the partial vapor pressure of said alcohols is between 10 mm. and 250 mm. (mercury).

15. In a process in which butyl alcohol is transformed primarily into dipropyl ketone by the action of essentially heavy metal oxide catalysts, the improvement which comprises passing through the reaction zone, at temperatures from 250° C. to 650° C., a gaseous mixture in which butyl alcohol constitutes the only reactant present in substantial concentration and in which the partial vapor pressure of said butyl alcohol is substantially lower than atmospheric.

16. In the catalytic production of dipropyl ketone from butyl alcohol by the action of essentially heavy metal oxide catalysts, the improvement which comprises passing through the reaction zone, at temperatures from 250° C. to 650° C., a gaseous mixture in which butyl alcohol constitutes the only reactant present in substantial concentration and in which the partial vapor pressure of said butyl alcohol is between 10 mm. and 250 mm. mercury.

17. Process for the production of ketones which comprises subjecting to the action of catalysts chosen from the group consisting of catalysts comprising essentially oxygen compounds of metals of the first long period of the periodic table and catalytic masses essentially comprising (initially) a plurality of difficultly reducible metal oxides, a plurality of easily reducible metal oxides, and a metallic halide, at temperatures from 250° C. to 650° C., a gaseous mixture in which the vapors of alcohols containing more than two carbon atoms are the only reactants present in substantial concentration and in which the pressures for the said alcohol vapors are substantially lower than atmospheric.

18. Process for the production of dipropyl ketone which comprises subjecting to the action of catalysts comprising essentially oxygen compounds of metals of the first long period of the periodic table, at temperatures from 250° C. to 650° C., a gaseous mixture in which normal butyl alcohol vapor is the only reactant present in substantial concentration and in which the pressure for said butyl alcohol vapor is substantially lower than atmospheric.

19. Process for the production of dipropyl ketone which comprises subjecting to the action of catalysts comprising essentially oxygen compounds of metals of the first long period of the periodic table and an auxiliary substance comprising essentially an oxygen compound of an alkaline earth metal, at temperatures from 250° C. to 650° C., a gaseous mixture in which normal butyl alcohol vapor is the only reactant present in substantial concentration and in which the pressure for said butyl alcohol vapor is substantially lower than atmospheric.

20. Process for the production of dipropyl ketone which comprises subjecting to the action of catalysts essentially comprising (initially) a plurality of difficultly reducible metal oxides, a plurality of easily reducible metal oxides and a metallic halide, at temperatures from 250° C. to 650° C., a gaseous mixture in which normal butyl alcohol is the only reactant present in substantial concentration and in which the pressure for said butyl alcohol vapor is substantially lower than atmospheric.

21. Process for the production of dipropyl ketone which comprises subjecting to the action of catalysts essentially comprising (initially) a plurality of difficultly reducible metal oxides, a plurality of easily reducible metal oxides, a metallic halide, and an auxiliary substance comprising essentially an oxygen compound of an alkaline earth metal, at temperatures from 250° C. to 650° C., a gaseous mixture in which normal butyl alcohol is the only reactant present in substantial concentration and in which the pressure for said butyl alcohol vapor is substantially lower than atmospheric.

22. Process for the production of ketones which comprises subjecting to the action of catalysts essentially comprising (initially) a plurality of difficultly reducible metal oxides, a plurality of easily reducible metal oxides and a metallic halide, at temperatures from 250° C. to 650° C., a gaseous mixture containing a substantial concentration of vapors of alcohols containing more than two carbon atoms, the partial vapor pressure of said alcohol vapors being substantially lower than atmospheric.

23. Process for the production of ketones which comprises subjecting to the action of catalysts essentially comprising (initially) a plurality of difficultly reducible metal oxides, a plurality of easily reducible metal oxides and a metallic halide, at temperatures from 250° C. to 650° C., a gaseous mixture containing a substantial concentration of vapors of alcohols containing more than two carbon atoms, the partial vapor pressure of said alcohol vapors ranging from 10 mm. to 250 mm. of mercury.

24. Process for the production of ketones which comprises subjecting to the action of catalysts essentially comprising (initially) a plurality of difficultly reducible metal oxides, a plurality of easily reducible metal oxides and a metallic halide, at temperatures from 250° C. to 650° C., a gaseous mixture containing a substantial concentration of normal butyl alcohol vapor, the partial vapor pressure of said normal butyl alcohol vapor being substantially lower than atmospheric.

25. Process for the production of ketones which comprises subjecting to the action of catalysts essentially comprising (initially) a plurality of difficultly reducible metal oxides, a plurality of easily reducible metal oxides and a metallic halide, at temperatures from 250° C. to 650° C., a gaseous mixture containing a substantial concentration of normal butyl alcohol vapor, the partial vapor pressure of said normal butyl alcohol vapor ranging from 10 mm. to 250 mm. of mercury.

GROVER BLOOMFIELD.
LLOYD C. SWALLEN.
FRANCIS M. CRAWFORD.